(12) United States Patent
Ahn et al.

(10) Patent No.: US 10,601,076 B2
(45) Date of Patent: Mar. 24, 2020

(54) COMPOSITION FOR GEL POLYMER ELECTROLYTE AND GEL POLYMER ELECTROLYTE

(71) Applicant: LG Chem, Ltd., Seoul (KR)

(72) Inventors: Kyoung Ho Ahn, Daejeon (KR); Jung Hoon Lee, Daejeon (KR); Chul Haeng Lee, Daejeon (KR); Jeong Woo Oh, Daejeon (KR); Yi Jin Jung, Daejeon (KR); Sol Ji Park, Daejeon (KR)

(73) Assignee: LG Chem, Ltd. (KR)

( * ) Notice: Subject to any disclaimer, the term of this patent is extended or adjusted under 35 U.S.C. 154(b) by 101 days.

(21) Appl. No.: 15/759,704

(22) PCT Filed: Mar. 30, 2017

(86) PCT No.: PCT/KR2017/003517
§ 371 (c)(1),
(2) Date: Mar. 13, 2018

(87) PCT Pub. No.: WO2017/171449
PCT Pub. Date: Oct. 5, 2017

(65) Prior Publication Data
US 2019/0051937 A1 Feb. 14, 2019

(30) Foreign Application Priority Data
Mar. 30, 2016 (KR) ........................ 10-2016-0038575

(51) Int. Cl.
| | | |
|---|---|---|
| *H01M 10/0565* | (2010.01) | |
| *C08G 61/02* | (2006.01) | |
| *C08L 33/12* | (2006.01) | |
| *C08L 33/14* | (2006.01) | |
| *C08L 33/20* | (2006.01) | |
| *C08L 75/04* | (2006.01) | |
| *H01M 10/0525* | (2010.01) | |
| *H01M 10/0568* | (2010.01) | |
| *C08G 61/10* | (2006.01) | |
| *C09D 133/06* | (2006.01) | |
| *H01M 10/42* | (2006.01) | |
| *H01M 10/056* | (2010.01) | |

(52) U.S. Cl.
CPC ...... *H01M 10/0565* (2013.01); *C08G 61/025* (2013.01); *C08G 61/10* (2013.01); *C08L 33/12* (2013.01); *C08L 33/14* (2013.01); *C08L 33/20* (2013.01); *C08L 75/04* (2013.01); *C09D 133/068* (2013.01); *H01M 10/0568* (2013.01); *H01M 10/4235* (2013.01); *C08G 2261/12* (2013.01); *C08G 2261/143* (2013.01); *C08G 2261/149* (2013.01); *C08G 2261/1426* (2013.01); *C08G 2261/312* (2013.01); *C08G 2261/51* (2013.01); *C08G 2261/90* (2013.01); *C08L 2203/20* (2013.01); *H01M 10/056* (2013.01); *H01M 10/0525* (2013.01); *H01M 2300/0068* (2013.01); *H01M 2300/0082* (2013.01); *H01M 2300/0085* (2013.01); *H01M 2300/0088* (2013.01)

(58) Field of Classification Search
None
See application file for complete search history.

(56) References Cited

U.S. PATENT DOCUMENTS

| | | | |
|---|---|---|---|
| 6,420,072 B1 * | 7/2002 | Maruyama | C08F 220/48 252/62.2 |
| 2007/0107776 A1 * | 5/2007 | Li | H01G 9/2031 136/263 |
| 2014/0239239 A1 * | 8/2014 | Cha | H01M 4/622 252/519.33 |
| 2017/0084923 A1 | 3/2017 | Oh et al. | |

FOREIGN PATENT DOCUMENTS

| | | |
|---|---|---|
| JP | 2001243835 A | 9/2001 |
| JP | 2003197262 A | 7/2003 |
| JP | 2008285668 A | 11/2008 |
| KR | 20010029730 A | 4/2001 |
| KR | 20010060179 A | 7/2001 |
| KR | 20070101482 A | 10/2007 |
| WO | 2015151525 A1 | 10/2015 |

OTHER PUBLICATIONS

Search report from International Application No. PCT/KR2017/003517, dated Jul. 10, 2017.

* cited by examiner

*Primary Examiner* — Stephan J Essex
(74) *Attorney, Agent, or Firm* — Lerner, David, Littenberg, Krumholz & Mentlik, LLP

(57) ABSTRACT

The present invention relates to a composition for a gel polymer electrolyte and a gel polymer electrolyte prepared using the same, and specifically provides a composition for a gel polymer electrolyte including a lithium salt, an organic solvent, and a polymer A having an epoxy group represented by Formula 1, and a polymer B having an amine group and a cyanide group represented by Formula 2, wherein the polymers A and B are included in an amount of 1 to 20 wt % based on the total weight of the composition for a gel polymer electrolyte, and wherein a gel polymer electrolyte for a secondary battery can be prepared that includes a polymer network formed by combining the polymer A having an epoxy group represented by Formula 1 and the polymer B having an amine group and a cyanide group represented by Formula 2 in a three-dimensional structure.

20 Claims, No Drawings

COMPOSITION FOR GEL POLYMER ELECTROLYTE AND GEL POLYMER ELECTROLYTE

CROSS-REFERENCE TO RELATED APPLICATIONS

The present application is a national phase entry under 35 U.S.C. § 371 of International Application No. PCT/KR2017/003517, filed Mar. 30, 2017, which claims priority from Korean Patent Application No. 10-2016-0038575, filed on Mar. 30, 2016, the disclosures of which are incorporated herein by reference.

TECHNICAL FIELD

The present invention relates to a composition for a gel polymer electrolyte, and a gel polymer electrolyte prepared by polymerizing the same.

BACKGROUND ART

As the technical development and the demand for mobile devices increase, the demand for secondary batteries as an energy source has been rapidly increasing. Among secondary batteries, lithium secondary batteries having a high energy density and voltage have been commercialized and widely used.

Generally, a lithium secondary battery may be prepared using a positive electrode and a negative electrode that include an electrode active material which may intercalate and deintercalate lithium ions, and an electrolyte which is a delivery medium of lithium ions.

Conventionally, an electrolyte in a liquid state, particularly an ion conductive organic liquid electrolyte obtained by dissolving a salt in a non-aqueous organic solvent, has been widely used as an electrolyte. However, a liquid electrolyte may lead to leakage and ignition and explosion due to the high flammability of the non-aqueous organic solvent used. In addition, with the liquid electrolyte, a carbonate organic solvent may be decomposed while charging and discharging a lithium secondary battery, or a side reaction with an electrode may occur that generates a gas. The side reaction may be further accelerated during storage at a high temperature, increasing the amount of the gas generated.

The continuously gas generated causes an increase in internal pressure of a battery, thereby not only causing deformation of the battery such as expanding its thickness, but also causing local differences in adhesion at the electrode surface of the battery, resulting in the problem that the electrode reaction does not occur uniformly on the entire electrode surface.

Thus, in order to solve this stability problem of a liquid electrolyte, a method of using a gel polymer electrolyte which is free from leakage and the like has recently been proposed.

The gel polymer electrolyte may be prepared by impregnating a polymer matrix formed by the polymerization reaction of a polymerizable monomer and a polymerization initiator with an electrolyte containing an electrolyte salt and an electrolyte solvent, and then gelling the mixture.

However, the gel polymer electrolyte is disadvantageous in that the lithium ion conductivity is lower than that of the liquid electrolyte formed solely of an electrolyte. In order to solve this problem, a method of reducing the thickness of the gel polymer electrolyte has been proposed, but in this case, since mechanical strength is reduced and the gel polymer electrolyte is short-circuited during the production of the battery, there is a problem in the performance and safety of the secondary battery.

Therefore, there is a need for the development of a gel polymer electrolyte having improved battery performance such as ion conductivity, mechanical strength, and the like.

PRIOR ART LITERATURE

Korean Patent Publication No. 10-2001-0029730
Korean Patent Publication No. 10-2001-0060179

DISCLOSURE

Technical Problem

In order to address the above-described issues, an aspect of the present invention provides a composition for a gel polymer electrolyte including two types of polymers to form a polymer network.

Another aspect of the present invention provides a gel polymer electrolyte having improved ion conductivity and mechanical strength.

Technical Solution

In order to achieve the objectives, according to an embodiment of the present invention, there is provided a composition for a gel polymer electrolyte including a lithium salt, an organic solvent, a polymer A represented by the following Formula 1 and a polymer B represented by the following Formula 2, in which the polymers A and B are included in an amount of 1 to 20 wt % based on the total weight of the composition for a gel polymer electrolyte.

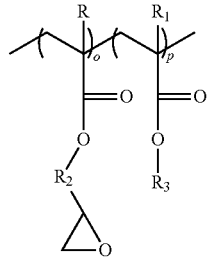

[Formula 1]

In Formula 1,

R and $R_1$ each independently represent hydrogen or an alkyl group having 1 to 3 carbon atoms, $R_2$ is a linear or non-linear alkylene group having 1 to 5 carbon atoms, $R_3$ is a linear or non-linear alkyl group having 1 to 5 carbon atoms, o and p represent the number of moles of a repeating unit, and the molar ratio of o:p is in a range of 10:10 to 10:90.

[Formula 2]

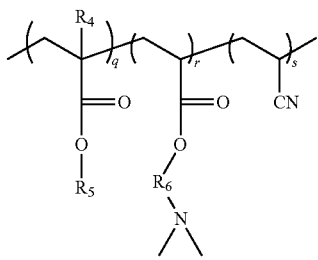

In Formula 2, $R_4$ is hydrogen or an alkyl group having 1 to 3 carbon atoms, $R_5$ is a linear or non-linear alkyl group having 1 to 5 carbon atoms, $R_6$ is a linear or non-linear alkylene group having 1 to 5 carbon atoms, q, r and s represent the number of moles of a repeating unit, and the molar ratio of q:r:s is in a range of 10 to 90:10 to 90:0 to 30.

The polymer A represented by Formula 1 may include one or more compounds selected from the group consisting of compounds represented by the following Formulas 1a and 1b.

[Formula 1a]

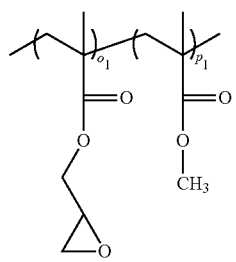

In Formula 1a, the molar ratio of o1:p1 is in the range of 10:10 to 10:90, and specifically 10:10.

[Formula 1b]

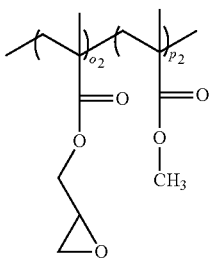

In Formula 1b, the molar ratio of $o_2:p_2$ is in the range of 10:10 to 10:90, and may specifically be 10:10.

The weight average molecular weight (Mw) of the polymer A represented by Formula 1 may be in the range of 20,000 to 500,000, and may specifically be 50,000.

Further, the polymer B represented by Formula 2 may include one or more compounds selected from the group consisting of compounds represented by the following Formulas 2a to 2c.

[Formula 2a]

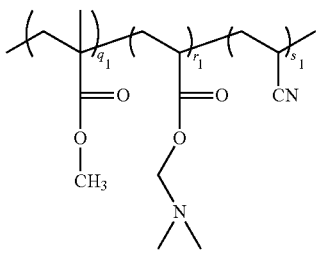

In Formula 2a, the molar ratio of $q_1:r_1:s_1$ may be in the range of 10 to 90:10 to 90:0 to 30, and may specifically be 10:10:5.

[Formula 2b]

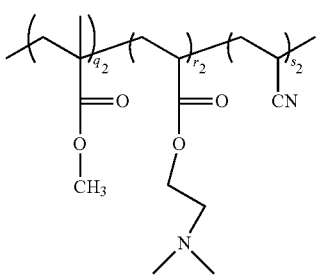

In Formula 2b, the molar ratio of $q_2:r_2:s_2$ may be in the range of 10 to 90:10 to 90:0 to 30, and may specifically be 10:10:5.

[Formula 2c]

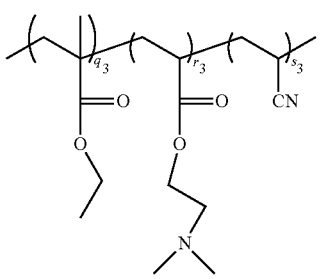

In Formula 2c, the molar ratio of $q_3:r_3:s_3$ is in the range of 10 to 90:10 to 90:0 to 30, and may specifically be 10:10:5.

The weight average molecular weight (Mw) of the polymer B represented by Formula 2 may be in the range of 20,000 to 500,000, and may specifically be 50,000.

The weight ratio of polymer A:polymer B may be in the range of 1:1 to 1:20, specifically 1:3 to 1:10, and more specifically 1:3 to 1:5.

Further, the lithium salt may include $Li^+$ as a cation and include one or more selected from the group consisting of $F^-$, $Cl^-$, $Br^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as an anion.

The organic solvent may include a non-aqueous organic solvent selected from the group consisting of a cyclic carbonate, a linear carbonate, a lactone, an ether, an ester, a sulfoxide, an acetonitrile, a lactam, and a ketone.

Further, according to an embodiment of the present invention, a gel polymer electrolyte prepared by curing the composition for the gel polymer electrolyte may be provided.

Here, the gel polymer electrolyte may include a polymer network; and an electrolyte impregnated in the polymer network, and the polymer network may be formed by combining the polymer A represented by Formula 1 and the polymer B represented by Formula 2 in a three-dimensional structure.

The weight ratio of polymer A:polymer B may be in the range of 1:1 to 1:20, specifically 1:3 to 1:10, and more specifically 1:3 to 1:5 in the gel polymer electrolyte.

The gel polymer electrolyte may further include a polymer C derived from a copolymerizable acrylate-based monomer.

The copolymerizable acrylate-based monomer may include one or more monomers selected from the group consisting of methyl acrylate, methyl methacrylate, ethyl acrylate, ethyl methacrylate, propyl acrylate, propyl methacrylate, butyl acrylate, butyl methacrylate, hexyl acrylate, hexyl methacrylate, ethylhexyl acrylate, ethylhexyl methacrylate, 2,2,2-trifluoroethyl acrylate, 2,2,2-trifluoroethyl methacrylate, 2,2,3,3-tetrafluoropropyl acrylate, and 2,2,3,3-tetrafluoropropyl methacrylate.

Further, the gel polymer electrolyte further may include a polymer D derived from a urethane-based compound.

Here, each of the polymers C and D may be included in an amount of 50 wt % or less based on the total content of the gel polymer electrolyte.

Furthermore, the gel polymer electrolyte may further include inorganic particles on the polymer network.

The gel polymer electrolyte may be used as an electrolyte for a lithium secondary battery.

Advantageous Effects

According to an embodiment of the present invention, there is provided a composition for a gel polymer electrolyte including a polymer network in which a polymer A having an epoxy group at side chains and a polymer B having an amine group and a cyanide group at side chains are combined in a three-dimensional structure, and thereby a gel polymer electrolyte having a uniform shape and excellent lithium ion conductivity and mechanical strength can be prepared. Moreover, a high-stability secondary battery in which lifetime characteristics and capacity characteristics are accordingly ensured can be manufactured using the above-described gel polymer electrolyte.

BEST MODE OF THE INVENTION

Hereinafter, the present invention will be described in detail in order to facilitate understanding of the present invention.

It should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Generally, the gel polymer electrolyte has a disadvantage in that ion conductivity and the like are lower than those of a liquid electrolyte, and safety and mechanical properties are inferior to those of a solid polymer electrolyte. Recently, studies have been conducted to improve the mechanical properties and ion conductivity of the gel polymer electrolyte using a copolymer such as an oligomer. However, when a single monomer is used when forming the oligomer, there is a problem in that cycle characteristics are deteriorated and the desired mechanical properties cannot be obtained. In addition, it is difficult to control physical properties and uniformly form a polymer in a secondary battery, and thus it is difficult to use the gel polymer electrolyte in a large-sized battery with high capacity.

Thus, in the present invention, a composition for a gel polymer electrolyte including a polymer network formed of polymers having physical properties capable of complementing electrochemical properties and mechanical properties and a gel polymer electrolyte prepared therefrom are provided to solve the above-described problems.

Specifically, according to an embodiment of the present invention, there is provided a composition for a gel polymer electrolyte including a lithium salt, an organic solvent, a polymer A represented by the following Formula 1 and a polymer B represented by the following Formula 2, in which the polymers A and B are included in an amount of 1 to 20 wt % based on the total weight of the composition for a gel polymer electrolyte.

[Formula 1]

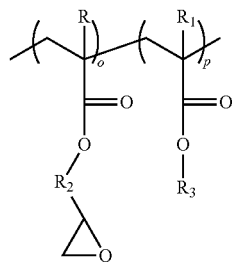

In Formula 1,

R and $R_1$ each independently represent hydrogen or an alkyl group having 1 to 3 carbon atoms, $R_2$ is a linear or non-linear alkylene group having 1 to 5 carbon atoms, $R_3$ is a linear or non-linear alkyl group having 1 to 5 carbon atoms, o and p represent the number of moles of a repeating unit, and the molar ratio of o:p is in a range of 10:10 to 10:90.

[Formula 2]

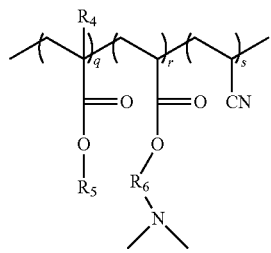

In Formula 2, $R_4$ is hydrogen or an alkyl group having 1 to 3 carbon atoms, $R_5$ is a linear or non-linear alkyl group having 1 to 5 carbon atoms, $R_6$ is a linear or non-linear alkylene group having 1 to 5 carbon atoms, q, r and s represent the number of moles of a repeating unit, and the molar ratio of q:r:s is in a range of 10 to 90:10 to 90:0 to 30.

Here, when the polymers A and B have the ratio of repeating units as described above, the polymers A and B have excellent miscibility, and thus can perform a stable polymerization reaction. When the molar ratio of the repeating unit p in the polymer A is lower than the molar ratio of the repeating unit o or when the molar ratio of the repeating unit q in the polymer B is less than 10, the polymers A and B are not uniformly mixed in the electrolyte due to a decrease in miscibility. Further, when the molar ratio of the repeating unit r involved in the polymerization reaction in the polymer B is less than 10, the content of reactive functional groups required to form a crosslinked structure is lowered relative to the solvent. When the content (solids) of the polymer is increased to solve the above-described problems, resistance may be increased and ion conductivity may be reduced due to the excess use of a polymer. Further, when the molar ratio of the repeating unit r of the polymer B is more than 90, the gel polymer electrolyte becomes electrochemically unstable.

Further, the polymers A and B may be included in an amount of 1 to 20 wt % based on the total weight of the composition for a gel polymer electrolyte. When the total content of the polymers is less than 1 wt %, it is difficult to form a network structure in the gel polymer electrolyte and gelation becomes difficult, thereby reducing mechanical properties of the gel polymer electrolyte. When the total content of the polymers is more than 20 wt %, while mechanical properties are increased, resistance increases due to polymers failing to form the network structure and remain in the electrolyte, and thus lithium ion conductivity of a secondary battery may be reduced and battery performance may deteriorate.

In the gel polymer electrolyte according to an embodiment of the present invention, the polymer A is a component for forming a three-dimensional structure in the gel polymer electrolyte, and representative examples thereof include one or more compounds selected from the group consisting of compounds represented by the following Formulas 1a and 1b.

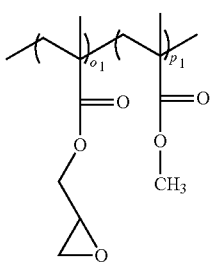

[Formula 1a]

In Formula 1a, the molar ratio of $o_1$:$p_1$ is in the range of 10:10 to 10:90, and may specifically be 10:10.

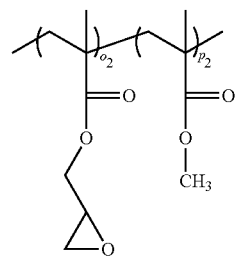

[Formula 1b]

In Formula 1b, the molar ratio of $o_2$:$p_2$ is in the range of 10:10 to 10:90, and may specifically be 10:10.

The weight average molecular weight (Mw) of the polymer A represented by Formula 1 may be in the range of 20,000 to 500,000, and may specifically be 50,000.

Here, in the present specification, the term "weight average molecular weight (Mw)" may refer to a conversion value of standard polyethylene oxide measured by a gel permeation chromatograph (GPC), and unless particularly indicated otherwise, a molecular weight may refer to a weight average molecular weight. For example, in the present invention, a measurement may be performed using an Agilent 4 series for GPC, in which 100 μl of a sample with a concentration of 1 mg/ml (0.45 μm filtered) is injected at a flow rate of 1.0 ml/min at 65° C. using PL mixed Bx2 columns and a 0.1 M DMF/0.05 M LiBr (0.45 μm filtered) solvent.

In the gel polymer electrolyte according to an embodiment of the present invention, the polymer B is a component for controlling mechanical properties and ion transport properties, and contains a nitrogen element such that anions of salts can be immobilized in the gel polymer electrolyte and the flexibility of the polymer and the rigid bonding structure between the molecules can be realized.

As a representative example, the polymer B may include one or more compounds selected from the group consisting of compounds represented by the following Formulas 2a to 2c.

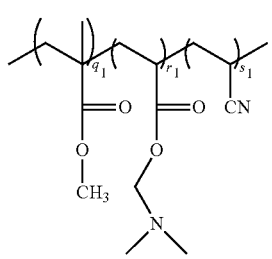

[Formula 2a]

In Formula 2a, the molar ratio of $q_1$:$r_1$:$s_1$ is in the range of 10 to 90:10 to 90:0 to 30, and may specifically be 10:10:5.

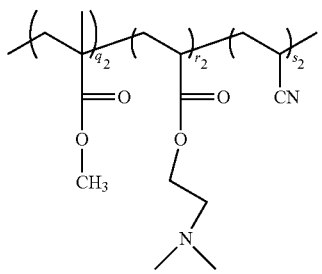

[Formula 2b]

In Formula 2b,
the molar ratio of $q_2:r_2:s_2$ is in the range of 10 to 90:10 to 90:0 to 30, and may specifically be 10:10:5.

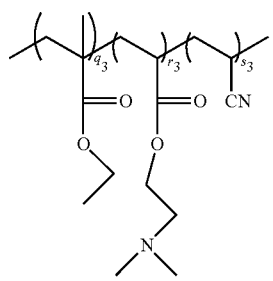

[Formula 2c]

In Formula 2c,
the molar ratio of $q_3:r_3:s_3$ is in the range of 10 to 90:10 to 90:0 to 30, and may specifically be 10:10:5.

The weight average molecular weight (Mw) of the polymer B represented by Formula 2 may be in the range of 20,000 to 500,000, and may specifically be 50,000.

The weight ratio of polymer A:polymer B may be in the range of 1:1 to 1:20, specifically 1:3 to 1:10, and more specifically 1:3 to 1:5.

Here, when the weight ratio value of the polymer B is 1 or less, since the gel formation reaction is degraded, it is difficult to form a gel polymer electrolyte having a uniform shape. When the weight ratio value of the polymer B is more than 20, oxidation reactivity is increased and electrochemical stability is reduced, and thus it may be difficult to use the gel polymer electrolyte in a high-voltage battery.

Further, the lithium salt may include $Li^+$ as a cation, and include one or more selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as an anion.

Further, in the composition for a gel polymer electrolyte of the present invention, the organic solvent is not particularly limited as long as it is a non-aqueous organic solvent used in the production of a typical electrolyte, and representative examples thereof include a cyclic carbonate, a linear carbonate, an ether, an ester, a sulfoxide, an acetonitrile, a lactone, a lactam, a ketone, etc.

Examples of the cyclic carbonate include ethylene carbonate (EC), propylene carbonate (PC), butylene carbonate (BC), fluoroethylene carbonate (FEC), etc.

Examples of the linear carbonate include diethyl carbonate (DEC), dimethyl carbonate (DMC), dipropyl carbonate (DPC), ethyl methyl carbonate (EMC), methyl propyl carbonate (MPC), etc.

Examples of the ether include dibutyl ether, tetrahydrofuran, 2-methyltetrahydrofuran, 1,4-dioxane, 1,2-dimethoxyethane, 1,2-diethoxyethane, etc. Examples of the ester include ethyl formate, propyl formate, methyl acetate, ethyl acetate, propyl acetate, methyl propionate, ethyl propionate, butyl propionate, methyl pivalate, etc.

Further, an example of the sulfoxide includes dimethyl sulfoxide or the like.

An example of the lactone includes gamma butyrolactone (GBL), an example of the lactam includes N-methyl-2-pyrrolidone (NMP), and an example of the ketone includes polymethyl vinyl ketone. Further, halogen derivatives of the above-described organic solvents may also be used. The organic solvents may be used alone or in combination.

The gel polymer electrolyte composition according to an embodiment of the present invention may further include a first additive having two or more double bonds at the terminals thereof to enhance reactivity.

The first additive may include a copolymerizable acrylate-based monomer, and representative examples thereof include one or more monomers selected from the group consisting of methyl acrylate, methyl methacrylate, ethyl acrylate, ethyl methacrylate, propyl acrylate, propyl methacrylate, butyl acrylate, butyl methacrylate, hexyl acrylate, hexyl methacrylate, ethylhexyl acrylate, ethylhexyl methacrylate, 2,2,2-trifluoroethyl acrylate, 2,2,2-trifluoroethyl methacrylate, 2,2,3,3-tetrafluoropropyl acrylate, and 2,2,3,3-tetrafluoropropyl methacrylate.

After the gel polymer electrolyte is prepared, the first additive may be included such that the content of the first additive is 50 wt % or less, and specifically 20 wt % or less based on the total content of the electrolyte. When an excess amount of the first additive is included, cycle characteristics or the like may be deteriorated due to an increase in resistance.

Further, according to an embodiment of the present invention, a gel polymer electrolyte prepared by curing the composition for the gel polymer electrolyte may be provided.

Here, the gel polymer electrolyte may include a polymer network generated by a polymerization reaction of the compound represented by Formula 1 and the compound represented by Formula 2.

Specifically, according to an embodiment of the present invention, there is provided a gel polymer electrolyte including a polymer network; and an electrolyte impregnated in the polymer network, in which the polymer network is formed by combining a polymer A represented by the following Formula 1 and a polymer B represented by the following Formula 2 in a three-dimensional structure.

Generally, in the case of a polymer containing an element such as N or O, the elements are coordinated with Li ions to achieve an effect of improving ion conductivity. That is, the gel polymer electrolyte of the present invention includes a polymer network formed of the polymer A represented by Formula 1 in which an epoxy group is introduced into the side chain and the polymer B represented by Formula 2 in which an amine group and a cyanide group are introduced into the side chain, and thus the electrolyte can be gelled even in small amounts by controlling the molecular weight of the polymers forming the network structure, and thus ion conductivity and excellent mechanical properties can be ensured. In other words, since the gel polymer electrolyte of the present invention contains the polymer B including a nitrogen element, not only can excellent mechanical properties be achieved, but affinity with the polyolefin-based separating membrane can be increased as well, and resistance is reduced and ion transport properties are improved accordingly, thereby improving ion conductivity. When the polymers A and B are not separated and are contained in a gel polymer electrolyte in the form of a linearly-bonded polymer structure, flexibility is lowered, and thus it is difficult to form a stable network structure in the gel polymer electrolyte. Accordingly, ion conductivity and mechanical properties are degraded, and thus a linear polymer structure in which the polymers A and B are bonded together is excluded in the present invention.

Further, the gel polymer electrolyte of the present invention can form a network structure during the polymerization reaction without using a polymerization initiator, and thus has an advantage in that the gel polymer electrolyte can be introduced into a battery manufacturing process that is greatly affected by oxygen.

In the gel polymer electrolyte according to an embodiment of the present invention, the weight ratio of polymer A:polymer B may be in the range of 1:1 to 1:20, specifically 1:3 to 1:10, and more specifically 1:3 to 1:5 in the gel polymer electrolyte.

Here, when the weight ratio value of the polymer B is 1 or less, the gel formation reaction is degraded, and it is difficult to form a uniform gel polymer electrolyte. When the weight ratio value of the polymer B is more than 20, oxidation reactivity is increased and electrochemical stability is reduced, and thus it may be difficult to use the gel polymer electrolyte to a high-voltage battery.

In the gel polymer electrolyte according to an embodiment of the present invention, the polymer network may further include a polymer C derived from a copolymerizable acrylate-based monomer in order to further improve mechanical strength and curing effects.

The copolymerizable acrylate-based monomer may include one or more monomers selected from the group consisting of methyl acrylate, methyl methacrylate, ethyl acrylate, ethyl methacrylate, propyl acrylate, propyl methacrylate, butyl acrylate, butyl methacrylate, hexyl acrylate, hexyl methacrylate, ethylhexyl acrylate, ethylhexyl methacrylate, 2,2,2-trifluoroethyl acrylate, 2,2,2-trifluoroethyl methacrylate, 2,2,3,3-tetrafluoropropyl acrylate, and 2,2,3,3-tetrafluoropropyl methacrylate.

The polymer C is preferably included in an amount of 50 wt % or less, and specifically 20 wt % or less based on the total content of the gel polymer electrolyte. When the content of the polymer C is more than 50 wt %, resistance increases due to the excessive amount of the polymer, and thus cycle characteristics or the like may be deteriorated.

Furthermore, the gel polymer electrolyte according to an embodiment of the present invention may further include a polymer D derived from a urethane-based compound in order to control the affinity with a separating membrane using mechanical properties and low polarity.

The polymer D is preferably included in an amount of 50 wt % or less, and specifically 20 wt % or less based on the total content of the gel polymer electrolyte. When the content of the polymer D is more than 50 wt %, resistance increases due to the excessive amount of the polymer, and thus cycle characteristics or the like may be deteriorated.

Further, the gel polymer electrolyte according to an embodiment of the present invention may optionally further include inorganic particles on the polymer network in order to increase flame retardancy and enhance specific functionalities.

The inorganic particles may be impregnated into the polymer network to allow a highly viscous solvent to penetrate well through pores formed by empty spaces between the inorganic particles. That is, when inorganic particles are included, wettability of the highly viscous solvent can be improved through capillary action and the affinity between the polar materials.

The inorganic particles may be included in an amount of 10 to 25 wt % based on the total weight of the gel polymer electrolyte.

Inorganic particles having a high dielectric constant and having no oxidation and/or reduction reaction in an operating voltage range (for example, 0 to 5 V based on $Li/Li^+$) of the lithium secondary battery may be used as such inorganic particles.

Specifically, representative examples of the inorganic particles include a single material or a mixture of two or more selected from the group consisting of $BaTiO_3$, $Pb(Zr,Ti)O_3$ (PZT), $Pb_{1-x}La_xZr_{1-y}Ti_yO_3$ (PLZT, where $0<x<1$, $0<y<1$), $Pb(Mg_{1/3}Nb_{2/3})O_3$—$PbTiO_3$ (PMN-PT), hafnium ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, and a mixture thereof having a dielectric constant of 5 or more.

In addition to the inorganic particles, inorganic particles having a lithium ion transfer capacity, that is, lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitrides ($Li_xN_y$, $0<x<4$, $0<y<2$) such as $Li_3N$, $SiS_2$-based glass ($Li_xSi_yS_z$, $0<x<3$, $0<y<2$, $0<z<4$) such as $Li_3PO_4$—$Li_2S$—$SiS_2$, $P_2S_5$-based glass ($Li_xP_yS_z$, $0<x<3$, $0<y<3$, $0<z<7$) such as $LiI$—$Li_2S$—$P_2S_5$, or a mixture thereof may be further included.

The average particle diameter of the inorganic particles is preferably in the range of about 0.001 to 10 μm so as to have a suitable porosity in a uniform thickness in the solid polymer electrolyte. When the average particle diameter is less than 0.001 μm, dispersibility may deteriorate. When the average particle diameter is more than 10 μm, not only may the thickness of the porous coating layer increase, but the inorganic particles may be aggregated and exposed to the outside of the gel polymer electrolyte as well, resulting in a decrease in mechanical strength.

As described above, the measurement is performed on the gel polymer electrolyte of the present invention at a temperature of 25° C. using an impedance measurement analysis system, and the gel polymer electrolyte may have $Li^+$ ion conductivity of more than $1.0 \times 10^{-4}$ S/cm, specifically $1.0 \times 10^{-4}$ S/cm to $2.0 \times 10^{-2}$ S/cm.

As for the ion conductivity, after a gel polymer electrolyte film was formed, ion conductivity at room temperature was measured by an AC method using an S700 SevenExcellence and an Inlab 731 probe manufactured by Mettler-Toledo, Inc.

Further, the gel content of the gel polymer electrolyte at a temperature of 25° C. may be about 1 wt % or more, and specifically about 20 wt % or more.

Further, in the gel polymer electrolyte, the content of unreacted oligomers with respect to the total amount of reactive oligomers is preferably 20% or less at a temperature of 25° C.

Here, the content of unreacted polymers may be determined by extracting the gel polymer electrolyte using a solvent (acetone) after the implementation of the gel polymer electrolyte, and then measuring the extracted solvent using NMR measurement.

Further, in the gel polymer electrolyte of the present invention, the electrolyte impregnated in the polymer network is a non-aqueous electrolytic solution formed of a lithium salt-containing non-aqueous solvent conventionally used in an electrolyte for a lithium secondary battery, as described below.

The lithium salt may include $Li^+$ as a cation, and include one or more selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as an anion The lithium salt may be included at a concentration of 0.8M to 2M in the electrolyte.

Further, as the non-aqueous solvent of the present invention, solvents such as ether solvents, ester solvents (acetates, propionates), amide-based solvents, linear carbonates or cyclic carbonates, nitrile-based solvents (acetonitrile, SN, and the like), and the like may be used alone or in combination of two or more thereof.

Among these, a carbonate compound including a cyclic carbonate, a linear carbonate, or a mixture thereof may be typically included.

Specific examples of the cyclic carbonate compound include one or a mixture of two or more of ethylene carbonate (EC), propylene carbonate (PC), 1,2-butylene carbonate, 2,3-butylene carbonate, 1,2-pentylene carbonate, 2,3-pentylene carbonate, vinylene carbonate, and halides thereof. Further, specific examples of the linear carbonate compound include one or a mixture of two or more selected from the group consisting of dimethyl carbonate (DMC), diethyl carbonate (DEC), dipropyl carbonate (DPC), ethyl methyl carbonate (EMC), methyl propyl carbonate (MPC), ethyl propyl carbonate (EPC), fluoroethylene carbonate (FEC), and difluoroethylene carbonate (DFEC).

Specifically, propylene carbonate, fluoroethylene carbonate, and ethylene carbonate, which are cyclic carbonates in the carbonate-based electrolyte solvent, are highly-viscous organic solvents and have a dielectric constant high enough to dissociate the lithium salt in the electrolyte, and thus may preferably be used. When such a cyclic carbonate is mixed in a suitable ratio with a linear carbonate having low viscosity and low dielectric constant such as ethylmethyl carbonate, diethyl carbonate, or dimethyl carbonate, an electrolyte having high electric conductivity can be prepared, and thus may more preferably be used. In particular, when fluoroethylene carbonate is included as the cyclic carbonate solvent, the fluoroethylene carbonate has excellent reactivity with an amine structure of the polymer B to form a fluorocarbamate, which can form a network structure by crosslinking with an epoxy group of the polymer A in the preparation of the gel polymer electrolyte, and thus oxidation stability can be further enhanced.

The gel polymer electrolyte according to an embodiment of the present invention may be prepared using conventional polymerization methods known in the related field.

For example, the gel polymer electrolyte may be prepared by injecting a composition for a gel polymer electrolyte including a lithium salt, an organic solvent, and the polymer A represented by Formula 1 and the polymer B represented by Formula 2 into a lithium secondary battery, and then performing a polymerization reaction for the preparation of the conventional gel polymer electrolyte.

Preferably, the composition for a gel polymer electrolyte of the present invention does not include a polymerization initiator. That is, in the case of the composition for a gel polymer electrolyte of the present invention, an epoxy group of the polymer A and an amine group of the polymer B react with each other to form an intermolecular three-dimensional crosslinked structure even when no polymerization initiator is present in the polymerization reaction as shown in the following Reaction Formula 1 to form a crosslinked polymer network structure, and thereby self-curing occurs.

[Reaction Formula 1]

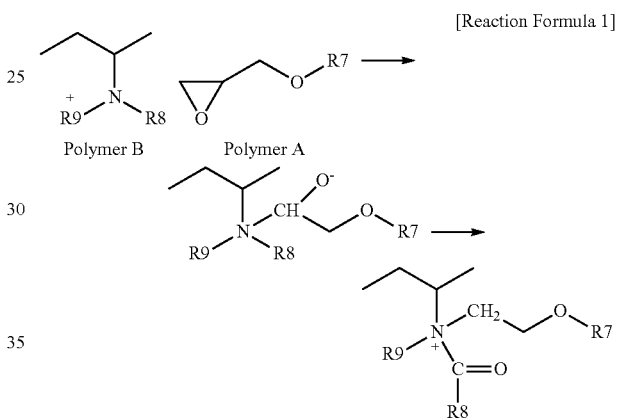

Here, substituents $R_7$ to $R_9$ in Reaction Formula 1 each simply represent the remaining structures of the polymers A and B, respectively.

In addition to the components as described above, the composition for a gel polymer electrolyte according to an embodiment of the present invention may optionally further include other additives capable of realizing properties known in the related field to increase the efficiency of the gel reaction and to impart the effect of reducing resistance.

As representative examples of the such additives, general additives such as vinylene carbonate (VC), propane sultone (PS), succinonitrile (SN), AdN, ESa, PRS, FEC, $LiPO_2F_2$, LiODFB, LiBOB, TMSPa, TMSPi, TFEPa, TFEPi, and the like may be further included without limitation.

As described above, since the gel polymer electrolyte of the present invention includes a network structure formed by crosslinking between polymers, it is possible not only to improve mechanical properties, but also to increase high-voltage stability and reduce battery resistance and to ensure the resulting effect of improving ion conductivity. Accordingly, when the gel polymer electrolyte is used as an electrolyte for a lithium secondary battery, it is not necessary to increase the thickness of the gel polymer electrolyte, and a lithium secondary battery having improved lifetime characteristics and capacity characteristics can be produced.

In addition, it is possible to form a protective layer including a polymer on the surfaces of the positive electrode and the negative electrode, suppress side reactions through stabilization of anions using a polymer structure, and increase the adhesion between the electrodes to suppress gas generation in the battery at high temperature. Further, it is possible to strengthen a separator through the gel polymer and improve penetration stability and overcharging stability by reducing flame retardancy and volatility.

Further, a lithium secondary battery using the gel polymer electrolyte of the present invention may be prepared by conventional methods.

The lithium secondary battery may include a positive electrode and a negative electrode capable of intercalating and deintercalating lithium, a separator disposed between the positive electrode and the negative electrode, and the gel polymer electrolyte of the present invention disposed between the positive electrode, negative electrode, and separator.

To this end, the gel polymer electrolyte may be formed by performing in-situ polymerization of the composition for a gel polymer electrolyte in a secondary battery.

According to a more preferred embodiment, the gel polymer electrolyte may be prepared by a method including (a) inserting an electrode assembly formed by wrapping a positive electrode, a negative electrode, and a separator disposed between the positive electrode and the negative electrode in a battery case; and (b) inserting the composition for a gel polymer electrolyte of the present invention in the case and polymerizing (curing) to form a gel polymer electrolyte.

The in-situ polymerization reaction in the lithium secondary battery may be performed using e-beam, gamma ray, and room or high temperature aging processes. According to an embodiment of the present invention, the in-situ polymerization reaction may be performed by thermal polymerization. Here, a reaction time may be about 2 minutes to 12 hours, and a thermal polymerization temperature may be in the range of 30 to 100° C.

More specifically, in the in-situ polymerization reaction in the lithium secondary battery, a predetermined amount of an oligomer is added to an electrolyte containing a lithium salt and mixed, and the mixture is injected into a battery cell. An injection inlet of the battery cell is sealed and then polymerization is performed by heating at 40 to 80° C. for 1 to 20 hours, the electrolyte containing the lithium salt is subjected to gelation, and thereby a gel polymer electrolyte contained in the form of a gel is prepared.

The lithium secondary battery according to an embodiment of the present invention has a charge voltage ranging from 3.0 V to 5.0 V, and thus capacity characteristics of the lithium secondary battery are excellent in both normal and high voltage ranges.

Further, the electrodes forming the lithium secondary battery may be produced using conventional methods known in the related field. For example, a slurry is prepared by mixing an electrode active material with a solvent, a binder, a conductive material and a dispersant as necessary and stirring, and then is applied (coated) onto a metal current collector, pressed and dried to produce an electrode.

Specifically, the positive electrode may be formed by applying a positive electrode active material slurry including a positive electrode active material, optionally, a conductive material, a binder, a solvent, and the like onto a positive electrode current collector, and then drying and pressing.

The positive electrode current collector is generally manufactured to a thickness of 3 μm to 500 μm. Any positive electrode current collector may be used without particular limitation so long as high conductivity is provided without causing chemical changes in the battery. Examples of the positive electrode current collector include stainless steel, aluminum, nickel, titanium, sintered carbon, and aluminum or stainless steel surface-treated with carbon, nickel, titanium or silver.

The positive electrode current collector may include fine irregularities on the surface thereof so as to enhance adhesion to the positive electrode active material. In addition, the positive electrode current collector may be used in various forms such as a film, a sheet, a foil, a net, a porous structure, a foam, and a nonwoven fabric.

The positive electrode active material is a compound capable of reversibly intercalating and deintercalating lithium, and specifically may include a lithium composite metal oxide including lithium and one or more metals such as cobalt, manganese, nickel, or aluminum. More specifically, examples of the lithium composite metal oxide include lithium-manganese-based oxides such as $LiMnO_2$, $LiMn_2O_4$, and the like, lithium-cobalt-based oxides such as $LiCoO_2$, lithium-nickel-based oxides such as $LiNiO_2$, lithium-nickel-manganese-based oxides such as $LiNi_{1-Y}Mn_YO_2$ (where $0<Y<1$), $LiMn_{2-Z}Ni_ZO_4$ (where $0<Z<2$), and the like, lithium-nickel-cobalt-based oxides such as $LiNi_{1-Y1}Co_{Y1}O_2$ (where $0<Y1<1$), lithium-manganese-cobalt-based oxides such as $LiCo_{1-Y2}Mn_{Y2}O_2$ (where $0<Y2<1$), $LiMn_{2-Z1}Co_{Z1}O_4$ (where $0<Z1<2$) and the like, lithium-nickel-manganese-cobalt-based oxides such as $Li(Ni_pCo_qMn_{r1})O_2$ (where $0<p<1$, $0<q<1$, $0<r1<1$, $p+q+r1=1$), $Li(Ni_{p1}Co_{q1}Mn_{r2})O_4$ (where $0<p1<2$, $0<q1<2$, $0<r2<2$, $p1+q1+r21=2$) and the like, oxides of lithium-nickel-cobalt-transition metal (M) such as $Li(Ni_{p2}Co_{q2}Mn_{r3}MS_2)O_2$ (where M is selected from the group consisting of Al, Fe, V, Cr, Ti, Ta, Mg, and Mo, and p2, q2, r3. and s2 each independently represent atom fractions of elements, $0<p2<1$, $0<q2<1$, $0<r3<1$, $0<s2<1$, and $p2+q2+r3+s2=1$) and the like, and one or two or more thereof may be included. Among these, in terms of improving the capacity characteristics and stability of the battery, the lithium composite metal oxide may be $LiCoO_2$, $LiMnO_2$, $LiNiO_2$, lithium nickel manganese cobalt oxides such as $Li(Ni_{0.6}Mn_{0.2}Co_{0.2})O_2$, $Li(Ni_{0.5}Mn_{0.3}Co_{0.2})O_2$, $Li(Ni_{0.8}Mn_{0.1}Co_{0.1})O_2$, and the like, or lithium nickel cobalt aluminum oxides such as $Li(Ni_{0.8}Co_{0.5}Al_{0.05})O_2$ and the like. Considering the remarkable improvement effect possible by controlling the type and content ratio of the constituent elements forming the lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, and the like, and one or a mixture of two or more thereof may be used.

The positive electrode active material may be included in an amount of 80 to 99 wt % based on the total weight of solids in the positive electrode active material slurry.

The conductive material is commonly added in an amount of 1 to 30 wt % based on the total weight of solids in the positive electrode active material slurry.

Any conductive material may be used without particular limitation so long as it has suitable conductivity without causing adverse chemical changes in the battery. Examples of suitable conductive materials include graphite; a carbon-based material such as carbon black, acetylene black, Ketjen black, channel black, furnace black, lamp black, and thermal black; conductive fibers such as carbon fibers and metallic fibers; metallic powders such as carbon fluoride powders, aluminum powders, and nickel powders; conductive whiskers such as zinc oxide and potassium titanate; conductive metal oxides such as titanium oxide; and polyphenylene derivatives. Specific examples of commercially available conductive materials may include various acetylene black (available from Chevron Chemical Company), Denka Black (available from Denka Singapore Private Limited and Gulf Oil Company), Ketjenblack, EC series (Armak Company), Vulcan XC-72 (available from Cabot Company), and super P (available from Timcal Co., Ltd.), and the like.

The binder is a component that assists in the binding between the active material and the conductive agent and in the binding with the current collector, and generally included in an amount of 1 to 30 wt % based on the total weight of solids of the positive electrode active material slurry. Examples of the binder include polyvinylidene fluoride (PVDF), polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluororubbers, various copolymers, etc.

The solvent may include an organic solvent such as N-methyl-2-pyrrolidone (NMP), and may be used in an amount in which preferable viscosity is obtained when the positive electrode active material, and optionally the binder and the conductive material, are included. For example, the solvent may be included such that the solid content in the solvent is in the range of 50 wt % to 95 wt %, and preferably 70 wt % to 90 wt %, in a slurry including the positive electrode active material and optionally the binder and the conductive material.

Further, the negative electrode may be formed by applying a negative electrode active material slurry including, optionally, a negative electrode active material, a binder, a conductive material, a solvent, and the like onto a negative electrode current collector, and then drying and pressing.

The negative electrode current collector is generally manufactured to a thickness of 3 µm to 500 µm. Any negative electrode current collector may be used without particular limitation so long as conductivity is provided without causing chemical changes in the battery. Examples of the negative electrode current collector include copper, stainless steel, aluminum, nickel, titanium, sintered carbon, or copper or stainless steel surface-treated with carbon, nickel, titanium or silver, an aluminum-cadmium alloy and the like. The negative electrode current collector may include fine irregularities on the surface thereof so as to enhance adhesion to the negative electrode active material as the positive electrode current collector. In addition, the negative electrode current collector may be used in various forms such as a film, a sheet, a foil, a net, a porous structure, a foam, and a nonwoven fabric.

As the negative electrode active material, carbon-based negative electrode active materials such as crystalline carbon, amorphous carbon, or a carbon composite may be used alone or in combination of two or more thereof, and preferably the negative electrode active material may be a crystalline carbon such as a graphite carbon such as natural graphite and artificial graphite.

The negative electrode active material may be included in an amount of 60 to 97 wt %, and preferably 80 to 97 wt % based on the total weight of solids in the negative electrode active material slurry.

Further, there is no particular limit as to the conductive material as long as it does not cause any side reactions with other elements of the secondary battery and has conductivity. Examples of conductive materials include one or a mixture of two or more selected from the group consisting of natural graphite, artificial graphite, carbon black, acetylene black, Ketjen black, channel black, furnace black, lamp black, thermal black, carbon nanotubes, fullerenes, carbon fibers, metallic fibers, carbon fluoride powder, aluminum powder, nickel powder, zinc oxide, potassium titanate, titanium oxide, and polyphenylene derivatives.

The conductive material may be added in an amount of about 0.05 to 3 wt % based on the total weight of solids in the negative electrode active material slurry.

The binder is for binding the active material particles to maintain a molded article, and examples thereof include one or a mixture of two or more selected from the group consisting of an acrylonitrile-butadiene rubber, a styrene-butadiene rubber (SBR), hydroxyethylcellulose, vinylidene fluoride-hexafluoropropylene copolymer (PVDF-co-HFP), polyvinylidenefluoride, polyvinyl alcohol, starch, polyacrylonitrile, hydroxypropylcellulose, regenerated cellulose, polymethylmethacrylate, polyvinyl pyrrolidone, tetrafluoroethylene, polyethylene, polypropylene, polyacrylic acid, an ethylene-propylene-diene monomer (EPDM), a sulfonated EPDM, and polytetrafluoroethylene (PTFE).

The binder may be included in an amount of about 0.5 to 3 wt % based on the total weight of solids in the negative active material slurry. Here, when the content is less than 0.5 wt %, it is difficult to ensure the adhesion of the electrode. When the content is more than 3 wt %, electrode resistance may increase.

The solvent may include water or an organic solvent such as N-methyl-2-pyrrolidone (NMP), an alcohol, and the like, and may be used in an amount sufficient to dissolve and disperse the electrode active material, the binder, and the conductive material in consideration of the coating thickness of the electrode active material slurry and the production yield. For example, the solvent may be included such that the solid content in the solvent is in the range of 50 wt % to 95 wt % and preferably 70 wt % to 90 wt % in the total electrode active material slurry including the negative electrode active material, the binder, the conductive material and a cellulose-based compound.

Further, a separator may be present between the positive electrode and the negative electrode depending on the type of the lithium secondary battery. As such a separator, a conventional porous polymer film, that is, polyethylene, polypropylene, polyvinylidene fluoride or a multilayer film of two or more thereof may be used, and a mixed multilayer film such as a polyethylene/polypropylene double layered separator, a polyethylene/polypropylene/polyethylene triple layered separator, a polypropylene/polyethylene/polypropylene triple layered separator, and the like may be used. Further, conventional porous nonwoven fabrics, for example, nonwoven fabrics formed of glass fibers with a high melting point, polyethylene terephthalate fibers and the like may be used, but the present invention is not limited thereto The appearance of the lithium secondary battery according to an embodiment of the present invention is not limited, and may be of a cylindrical type using a can, a prismatic type, a pouch type, a coin type, etc.

MODES OF THE INVENTION

Hereinafter, the present invention will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

EXAMPLES

I. Preparation of Gel Polymer Electrolyte

Example 1

1M $LiPF_6$ was dissolved in a non-aqueous electrolyte solvent having a composition of ethylene carbonate (EC): ethylmethyl carbonate (EMC):dimethyl carbonate (DMC) in a volume ratio of 2:3:5 to prepare a non-aqueous electrolyte 98.7 g. 0.3 g of a polymer A (the molar ratio of o1:p1 was 50:50, and a weight average molecular weight (Mw) was 50,000) represented by Formula 1a and 1g of a polymer B (the molar ratio of q1:p1:r1 was 45:45:10, and a weight average molecular weight (Mw) was 50,000) represented by Formula 2a were added to the non-aqueous electrolyte, and thereby a composition for a gel polymer electrolyte (the weight ratio of polymer A:polymer B was 0.3:1) was prepared.

A gel polymer electrolyte was prepared by polymerizing the composition for a gel polymer electrolyte at 65° C. using a thermal curing method.

Example 2

The composition for a gel polymer electrolyte (the weight ratio of polymer A:polymer B was 0.5:2) of the present invention was prepared in the same manner as in Example 1 except that 0.5 g of the polymer A represented by Formula 1a and 2.0 g of the polymer B represented by Formula 2a were added to 97.5 g of the non-aqueous electrolyte.

Example 3

The composition for a gel polymer electrolyte (the weight ratio of polymer A:polymer B was 1:3) of the present invention was prepared in the same manner as in Example 1 except that 1.0 g of the polymer A represented by Formula 1a and 3.0 g of the polymer B represented by Formula 2a were added to 96 g of the non-aqueous electrolyte.

Comparative Example 1

The composition for a gel polymer electrolyte (the weight ratio of polymer A:polymer B was 0.1:0.5) of the present invention was prepared in the same manner as in Example 1 except that 0.1 g of the polymer A represented by Formula 1a and 0.5 g of the polymer B represented by Formula 2a were added to 99.4 g of the non-aqueous electrolyte.

Comparative Example 2

The composition for a gel polymer electrolyte (the weight ratio of polymer A:polymer B was 4:20) of the present invention was prepared in the same manner as in Example 1 except that 4.0 g of the polymer A represented by Formula 1a and 20 g of the polymer B represented by Formula 2a were added to 76 g of the non-aqueous electrolyte.

Experimental Examples

Experimental Example 1: Evaluation of Ion Conductivity of Polymer Electrolyte at Room Temperature Ion conductivity at room temperature was measured through the AC method using an S700 SevenExcellence and an Inlab 731 probe manufactured by Mettler-Toledo, Inc. for each of the gel polymer electrolytes prepared in Examples 1 to 3 and Comparative Examples 1 and 2. The results of measuring ion conductivity are shown in the following Table 1.

Experimental Example 2: Evaluation of Gel Modulus

The composition for the gel polymer electrolytes prepared in Examples 1 to 3 and Comparative Examples 1 and 2 were polymerized to prepare gel polymer electrolyte specimens, and then viscoelastic behavior of the specimens were measured through a rheometer to determine a gel modulus. The equipment used was DHR equipment manufactured by TA Instrument, Inc., and a modulus was expressed as a value measured at 1 Hz among the values obtained in the range of 0.1 to 10 Hz.

TABLE 1

| | Weight ratio | | | Total content of polymers in composition for gel polymer electrolyte (%) | Ion conductivity (S/cm) | Gel modulus (Pa) |
| --- | --- | --- | --- | --- | --- | --- |
| | Formula 1a | Formula 2a | Formula 1a:2a | | | |
| Example 1 | 0.3 | 1 | 1:3.3 | 1.3 | $1.16 \times 10^{-2}$ S/cm | 3070 |
| Example 2 | 0.5 | 2 | 1:4 | 2.5 | $10.2 \times 10^{-2}$ S/cm | 15600 |
| Example 3 | 1 | 3 | 1:3 | 4 | $9.6 \times 10^{-2}$ S/cm | 82300 |
| Comparative Example 1 | 0.1 | 0.5 | 1:5 | 0.6 | Ununiform | 230 |
| Comparative Example 2 | 4 | 20 | 1:5 | 24 | $2 \times 10^{-3}$ S/cm | 220800 |

Referring to Table 1, it can be confirmed that the gel polymer electrolytes prepared in Examples 1 to 3 had a high ion conductivity of an average of 1.0×10-2 S/cm or more and a gel modulus of 3070 Pa or more.

On the other hand, in the case of Comparative Example 1 in which the total content of the polymers in the composition was less than 1 wt % in the preparation of the gel polymer electrolyte, it was difficult to form a network structure in the gel polymer electrolyte, and thus difficult to attain stable ion conductivity. Accordingly, the mechanical properties of the gel polymer electrolyte may have deteriorated. Further, it can be seen that, in the case of Comparative Example 2 in which the total content of the polymers in the composition was 24 wt % in the preparation of the gel polymer electrolyte, while mechanical properties were increased, the polymers which failed to form a network structure remained in the electrolyte to increase resistance, and thus lithium ion conductivity was lowered to about $2\times10^{-3}$ S/cm.

The invention claimed is:

1. A composition for a gel polymer electrolyte, comprising:
   a lithium salt;
   an organic solvent;
   a polymer A represented by Formula 1; and
   a polymer B represented by Formula 2,
   the polymers A and B are included in an amount of 1 wt % to 20 wt % based on a total weight of the composition for a gel polymer electrolyte,

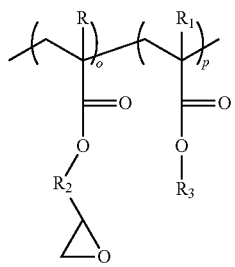

[Formula 1]

in Formula 1,
R and $R_1$ each independently represent hydrogen or an alkyl group having 1 to 3 carbon atoms,
$R_2$ is a linear or non-linear alkylene group having 1 to 5 carbon atoms,
$R_3$ is a linear or non-linear alkyl group having 1 to 5 carbon atoms,
o and p represent the number of moles of a repeating unit, and
a molar ratio of o:p is in a range of 10:10 to 10:90,

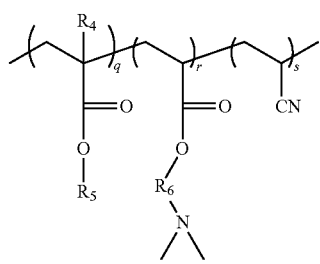

[Formula 2]

in Formula 2,
$R_4$ is hydrogen or an alkyl group having 1 to 3 carbon atoms,
$R_5$ is a linear or non-linear alkyl group having 1 to 5 carbon atoms,
$R_6$ is a linear or non-linear alkylene group having 1 to 5 carbon atoms,
q, r, and s represent the number of moles of a repeating unit, and
a molar ratio of q:r:s is in a range of 10 to 90:10 to 90:0 to 30.

2. The composition for a gel polymer electrolyte according to claim 1, wherein the polymer A represented by Formula 1 comprises a compound represented by Formula 1a,

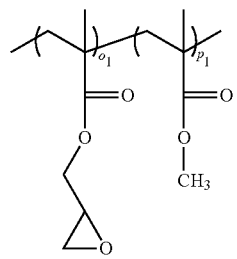

[Formula 1a]

in Formula 1a,
a molar ratio of $o_1$:$p_1$ is in a range of 10:10 to 10:90

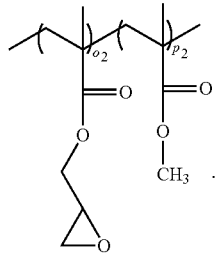

3. The composition for a gel polymer electrolyte according to claim 1, wherein a weight average molecular weight (Mw) of the polymer A is in a range of 20,000 to 500,000.

4. The composition for a gel polymer electrolyte according to claim 1, wherein the polymer B represented by Formula 2 is one or more selected from the group consisting of compounds represented by Formulas 2a to Formula 2c,

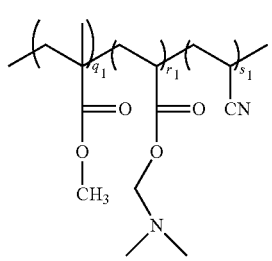

[Formula 2a]

in Formula 2a,
a molar ratio of $q_1$:$r_1$:$s_1$ is in a range of 10 to 90:10 to 90:0 to 30,

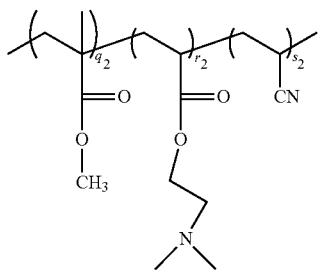

[Formula 2b]

in Formula 2b,
a molar ratio of $q_2:r_2:s_2$ is in a range of 10 to 90:10 to 90:0 to 30,

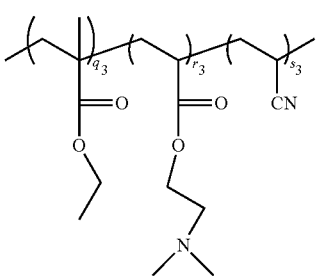

[Formula 2c]

in Formula 2c,
a molar ratio of $q_3:r_3:s_3$ is in a range of 10 to 90:10 to 90:0 to 30.

5. The composition for a gel polymer electrolyte according to claim 1, wherein a weight average molecular weight (Mw) of the polymer B is in a range of 20,000 to 500,000.

6. The composition for a gel polymer electrolyte according to claim 1, wherein a weight ratio of the polymer A:the polymer B is in a range of 1:1 to 1:20.

7. The composition for a gel polymer electrolyte according to claim 6, wherein a weight ratio of the polymer A:the polymer B is in a range of 1:3 to 1:10.

8. The composition for a gel polymer electrolyte according to claim 1, wherein the lithium salt includes $Li^+$ as a cation, and includes one or more selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as an anion.

9. The composition for a gel polymer electrolyte according to claim 1, wherein the organic solvent is a non-aqueous organic solvent selected from the group consisting of a cyclic carbonate, a linear carbonate, a lactone, an ether, an ester, a sulfoxide, an acetonitrile, a lactam, and a ketone.

10. A gel polymer electrolyte, prepared by curing the composition for a gel polymer electrolyte according to claim 1.

11. The gel polymer electrolyte according to claim 10, wherein the gel polymer electrolyte includes a polymer network; and an electrolyte impregnated in the polymer network, the polymer network is formed by combining the polymer A and the polymer B in a three-dimensional structure,

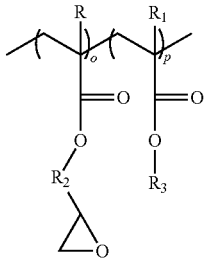

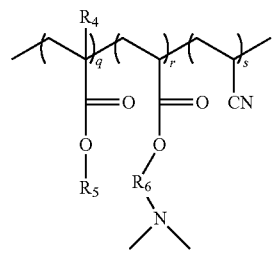

12. The gel polymer electrolyte according to claim 11, wherein a weight ratio of the polymer A:the polymer B is in a range of 1:1 to 1:20.

13. The gel polymer electrolyte according to claim 12, wherein a weight ratio of the polymer A:the polymer B is in a range of 1:3 to 1:10.

14. The gel polymer electrolyte according to claim 11, wherein the polymer network further includes a polymer C derived from a copolymerizable acrylate-based monomer.

15. The gel polymer electrolyte according to claim 14, wherein the copolymerizable acrylate-based monomer is one or more monomers selected from the group consisting of methyl acrylate, methyl methacrylate, ethyl acrylate, ethyl methacrylate, propyl acrylate, propyl methacrylate, butyl acrylate, butyl methacrylate, hexyl acrylate, hexyl methacrylate, ethylhexyl acrylate, ethylhexyl methacrylate, 2,2,2-trifluoroethyl acrylate, 2,2,2-trifluoroethyl methacrylate, 2,2,3,3-tetrafluoropropyl acrylate, and 2,2,3,3-tetrafluoropropyl methacrylate.

16. The gel polymer electrolyte according to claim 14, wherein the polymer C is included in an amount of 50 wt % or less based on a total content of the gel polymer electrolyte.

17. The gel polymer electrolyte according to claim 11, wherein the gel polymer electrolyte further includes a polymer D derived from a urethane-based compound.

18. The gel polymer electrolyte according to claim 17, wherein the polymer D is included in an amount of 50 wt % or less based on a total content of the gel polymer electrolyte.

19. The gel polymer electrolyte according to claim 11, wherein the gel polymer electrolyte further contains inorganic particles on the polymer network.

20. The gel polymer electrolyte according to claim 10, wherein the gel polymer electrolyte is an electrolyte for a lithium secondary battery.

* * * * *